US012198682B2

(12) United States Patent
Gunasekara et al.

(10) Patent No.: US 12,198,682 B2
(45) Date of Patent: Jan. 14, 2025

(54) CONVERSATION GENERATION USING SUMMARY-GROUNDED CONVERSATION GENERATORS

(71) Applicant: International Business Machines Corporation, Armonk, NY (US)

(72) Inventors: Chulaka Gunasekara, New Hyde Park, NY (US); Guy Feigenblat, Givataym (IL); Benjamin Sznajder, Jerusalem (IL); Sachindra Joshi, Gurgaon (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 245 days.

(21) Appl. No.: 17/473,019

(22) Filed: Sep. 13, 2021

(65) Prior Publication Data

US 2023/0079879 A1 Mar. 16, 2023

(51) Int. Cl.

| | |
|---|---|
| ***G10L 15/18*** | (2013.01) |
| ***G06F 18/21*** | (2023.01) |
| ***G06N 20/00*** | (2019.01) |
| ***G10L 15/06*** | (2013.01) |
| ***G10L 15/08*** | (2006.01) |
| ***G10L 15/32*** | (2013.01) |

(52) U.S. Cl.

CPC ........ *G10L 15/1815* (2013.01); *G06F 18/217* (2023.01); *G06N 20/00* (2019.01); *G10L 15/063* (2013.01); *G10L 15/083* (2013.01); *G10L 15/1822* (2013.01); *G10L 15/32* (2013.01); *G10L 2015/0631* (2013.01); *G10L 2015/0635* (2013.01)

(58) Field of Classification Search

CPC . G10L 15/1815; G10L 15/063; G10L 15/083; G10L 15/1822; G10L 15/32; G10L 2015/0631; G10L 2015/0635; G10L 13/027; G06F 18/217; G06F 40/56; G06F 40/35; G06N 20/00

USPC .......................................................... 704/251

See application file for complete search history.

(56) References Cited

U.S. PATENT DOCUMENTS

| | | | | |
|---|---|---|---|---|
| 11,508,360 | B2 * | 11/2022 | Peng | G06F 40/284 |
| 11,568,143 | B2 * | 1/2023 | Torres | G06N 3/045 |
| 2011/0321008 | A1 * | 12/2011 | Jhoney | G06F 3/167 704/235 |
| 2013/0218921 | A1 * | 8/2013 | Palay | G06F 16/22 707/769 |
| 2018/0341396 | A1 * | 11/2018 | Yaseen | G06F 16/90332 |
| 2020/0142958 | A1 * | 5/2020 | Krishnaswamy | G06F 40/30 |

(Continued)

FOREIGN PATENT DOCUMENTS

CN 111368051 A 7/2020

OTHER PUBLICATIONS

Summary Grounded Conversation Generation by Gunasekara (Year: 2021).*

(Continued)

*Primary Examiner* — Paras D Shah
*Assistant Examiner* — Fouzia Hye Solaiman
(74) *Attorney, Agent, or Firm* — Elliot J. Shine

(57) ABSTRACT

An example system includes a processor to receive a summary of a conversation to be generated. The processor can input the summary into a trained summary-grounded conversation generator. The processor can receive a generated conversation from the trained summary-grounded conversation generator.

20 Claims, 14 Drawing Sheets

(56) References Cited

U.S. PATENT DOCUMENTS

| | | | | |
|---|---|---|---|---|
| 2020/0218780 | A1* | 7/2020 | Mei | G06F 40/30 |
| 2021/0012791 | A1* | 1/2021 | Renard | G10L 21/10 |
| 2021/0019642 | A1* | 1/2021 | O'Malia | G06F 40/279 |
| 2021/0192140 | A1* | 6/2021 | Galley | H04L 51/42 |
| 2022/0310084 | A1* | 9/2022 | Brdiczka | G10L 15/063 |
| 2023/0026945 | A1* | 1/2023 | Friedlander | G06N 3/045 |

OTHER PUBLICATIONS

Jiwei Li et al., ("Deep Reinforcement Learning for Dialogue Generation") (Year: 2017).*

Pang "Text Generation by Learning From Demonstrations" (Year: 2021).*

Zhang, Grounded Conversation Generation as Guided Traverses in Commonsense Knowledge Graphs (Year: 2020).*

Li et al., "Deep Reinforcement Learning for Dialogue Generation", Proceedings of the 2016 Conference of Empirical Methods in Natural Language Processing, Austin, Texas, Nov. 1-5, 2016, pp. 1192-1202.

Mell et al., "The NIST Definition of Cloud Computing", National Institute of Standards and Technology, Sep. 2011, Special Publication 800-145, 7 pages.

Xu et al., "Knowledge Graph Grounded Goal Planning for Open-Domain Conversation Generation", The Thirty-Fourth AAAI Conference on Artificial Intelligence (AAAI-20), pp. 9338-9345.

Zhang et al., "Grounded Conversation Generation as Guided Traverses in Commonsense Knowledge Graphs", Proceedings of the 58th Annual Meeting of the Association for Computational Linguistics, Jul. 5-10, 2020, pp. 2031-2043.

Zheng et al., "Difference-aware Knowledge Selection for Knowledge-grounded Conversation Generation", Findings of the Association for Computational Linguistics: EMNLP 2020, Nov. 16-20, 2020, pp. 115-125.

Zhou et al., "Commonsense Knowledge Aware Conversation Generation with Graph Attention", Proceedings of the Twenty-Seventh International Joint Conference on Artificial Intelligence (IJCAI-18), Beijing, China, 7 pages.

Lewis et al., "BART: Denoising Sequence-to-Sequence Pre-Training for Natural Language Generation, Translation, and Comprehension", Oct. 29, 2019, 10 pages.

Schulman et al., "Proximal Policy Optimization Algorithms", Aug. 28, 2017, OpenAI, 12 pages.

* cited by examiner

100

200

300

400

500

600

700

800

900

| Summary: person_0 is inviting person_1 for [Easter]; person_1 will bring some [chocolate eggs]. |||
|---|---|---|
| Ground Truth Dialog: | SL-Gen: | RL-Gen: |
| <person_0> Hi darling, do you want to come for [Easter?] | <person_0>Hi person_1! | <person_0>How are you doing? |
| | <person_1>Hi person_0! | <person_1>Good, and you? You? |
| <person_1> love to, I'm off on Friday | <person_0>Are you still coming this [Easter?] | <person_0>Not bad. You? |
| <person_0> it's could be nice, I'll invite louise too | <person_1>Oh, yes! I'm coming this weekend. | <person_1>Not bad. |
| <person_1> great, I'll bring you [eggs,] [chocolate ones] of course! | <person_0>Ok, I'll bring some [chocolate] [eggs] and some [cake] | <person_0>Are you doing anything special for [Easter?] |
| | | <person_1>Hmm.... I don't know. |
| | | <person_0>Don't worry. I'm inviting you. |
| <person_0> Thanks darling. | <person_1>Great! | <person_1>Oh, cool. |
| | | <person_0>What do you want to bring? |
| | | <person_1>I'll bring some [chocolate] [eggs.] |
| | | <person_0>Good idea! |
| | | <person_1>No problem. |
| 1304 | 1306 | 1308 |

1302

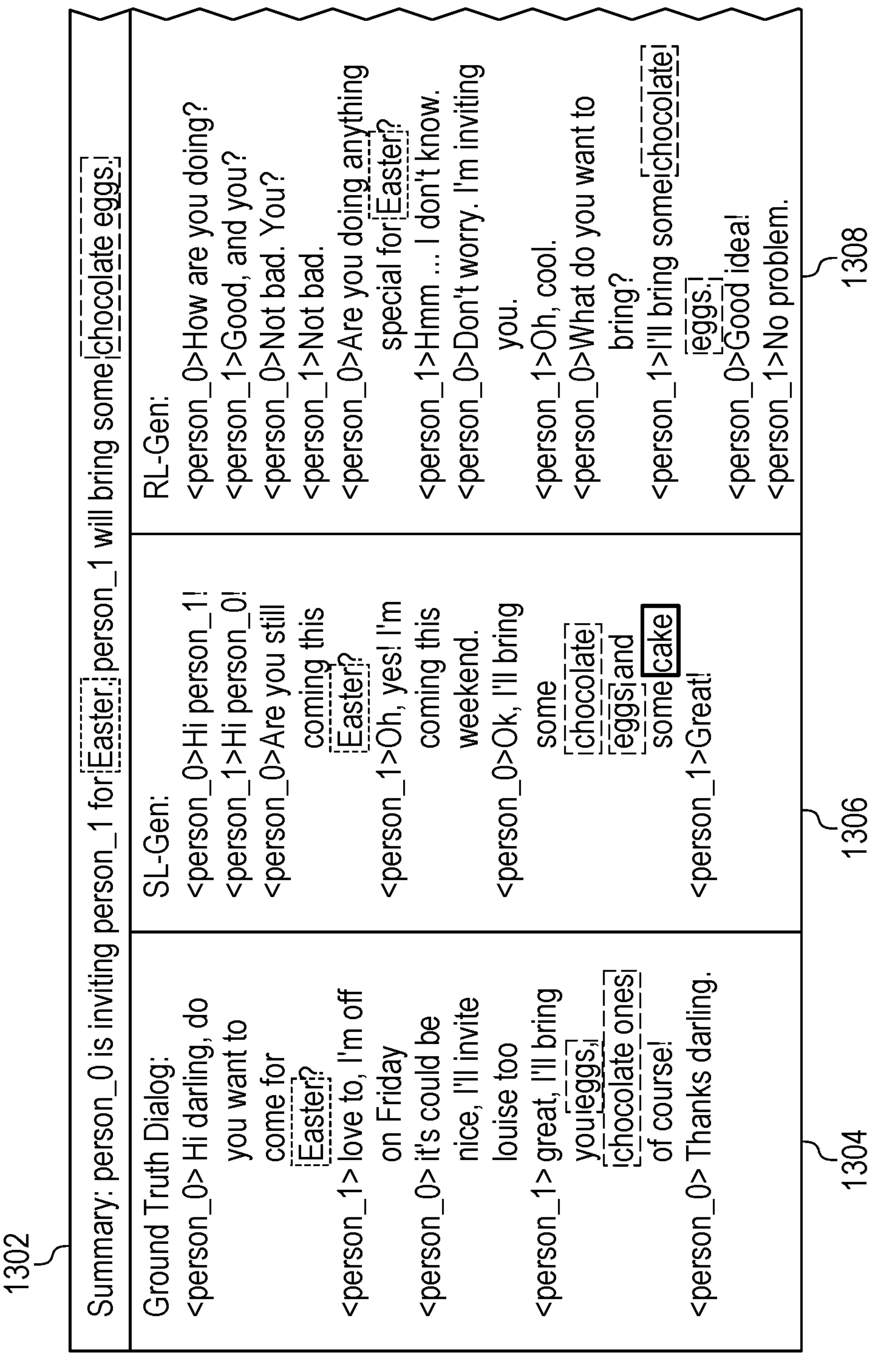

FIG. 13A

CN-Gen (5 turns):
<person_0> I'm inviting you over for Easter ;)
<person_1> Yay!
<person_0> What can you bring?
<person_1> Ok, I'll bring some chocolate eggs, what do you think?
<person_0> You're so sweet <3

CN-Gen (9 turns):
<person_0> Hey, how are you?
<person_1> Doing good. And you?
<person_0> I'm fine
<person_0> Do you have any plans for Easter?
<person_1> Not really.
<person_0> Would you like to come over?
<person_1> I would love to.
<person_1> I'll bring some chocolate eggs!
<person_0> Awesome!

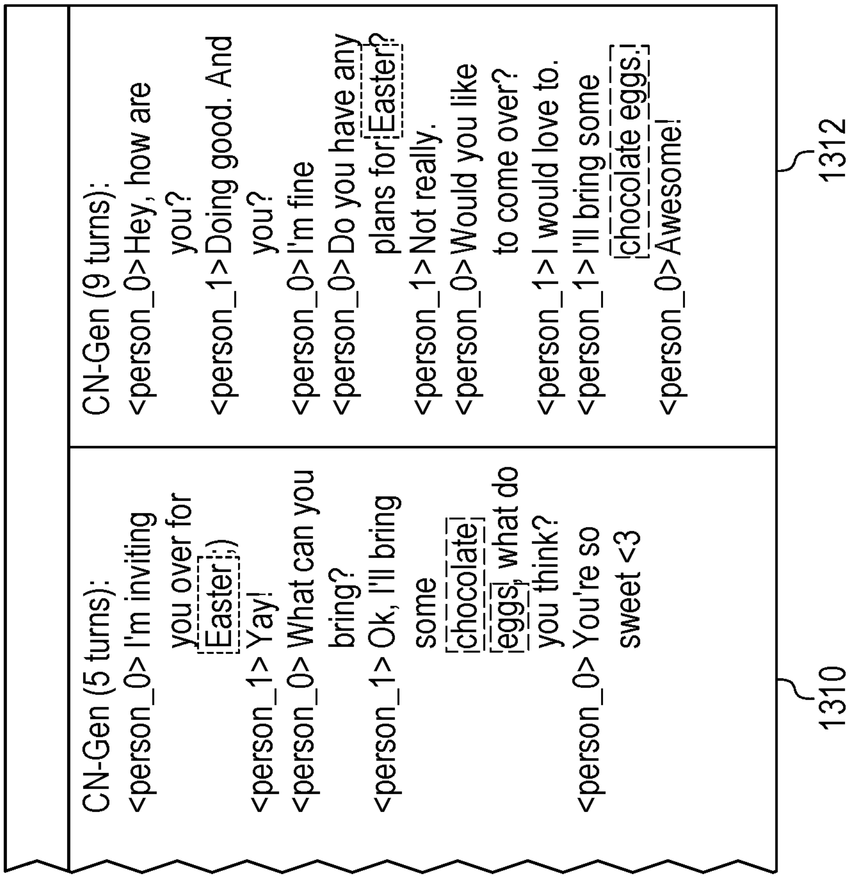

FIG. 13B

CONVERSATION GENERATION USING SUMMARY-GROUNDED CONVERSATION GENERATORS

BACKGROUND

The present techniques relate to generating conversations. More specifically, the techniques relate to automatic generation of conversations.

SUMMARY

According to an embodiment described herein, a system can include processor to receive a summary of a conversation to be generated. The processor can also further input the summary into a trained summary-grounded conversation generator. The processor can also receive a generated conversation from the trained summary-grounded conversation generator.

According to another embodiment described herein, a method can include receiving, via a processor, a summary of a conversation to be generated. The method can further include inputting, via the processor, the summary into a trained summary-grounded conversation generator. The method can also further include receiving, via the processor, a generated conversation from the trained summary-grounded conversation generator.

According to another embodiment described herein, a computer program product for generating summary-grounded conversations can include computer-readable storage medium having program code embodied therewith. The computer readable storage medium is not a transitory signal per se. The program code executable by a processor to cause the processor to receive a summary of a conversation to be generated. The program code can also cause the processor to input the summary into a trained summary-grounded conversation generator. The program code can also cause the processor to receive a generated conversation from the trained summary-grounded conversation generator.

BRIEF DESCRIPTION OF THE SEVERAL VIEWS OF THE DRAWINGS

FIG. 13A is an example set of conversations generated by various embodiments described herein; and FIG. 13B is a continuation of the example set of conversations generated by various embodiments described herein.

DETAILED DESCRIPTION

In order to train summarization networks that summarize conversations, conversation data may be used during training. Such conversation data may come from actual human-to-human (H2H) conversation logs. For example, H2H conversation logs may be collected in crowd-sourced environments role played by crowd-workers. Because H2H logs are scarce, datasets are sometimes created in crowd-sourced environments. However, crowd-sourcing may be time consuming, costly and the quality of crowd-sourced conversation logs may be questionable. The data collection process can thus be time consuming and presents many challenges to ensure data quality.

According to embodiments of the present disclosure, an example system includes a processor to receive a summary of a conversation to be generated. The processor can input the summary into a trained summary-grounded conversation generator. The processor can receive a generated conversation from the trained summary-grounded conversation generator. Thus, embodiments of the present disclosure enable different conversations to be generated from the same summary. The generated conversations can be used to augment datasets used for training conversation summarizers. In particular, once a conversation summarization dataset is augmented with the generated conversations, the performance of the downstream summarization task networks trained on the augmented conversation summarization dataset may be improved. In particular, the quality of the conversations using the techniques described herein was confirmed using both automatic evaluation and human evaluation. For example, automatic evaluation was performed using BLEU-3, METEOR, and ROUGE-L comparisons between the generated conversations and ground truth conversations and summaries of the generated conversations with ground truth summaries. In addition, the quality of the generated conversations was further evaluated by augmenting a conversation summarization data with generated conversations. A noted improvement in the trained conversation summarization model resulted from augmenting the training data set with the generated conversations. In particular, the use of augmented training data containing 30% generated conversations was found to result particular improved performance for the particular task being evaluated.

Figure 1:
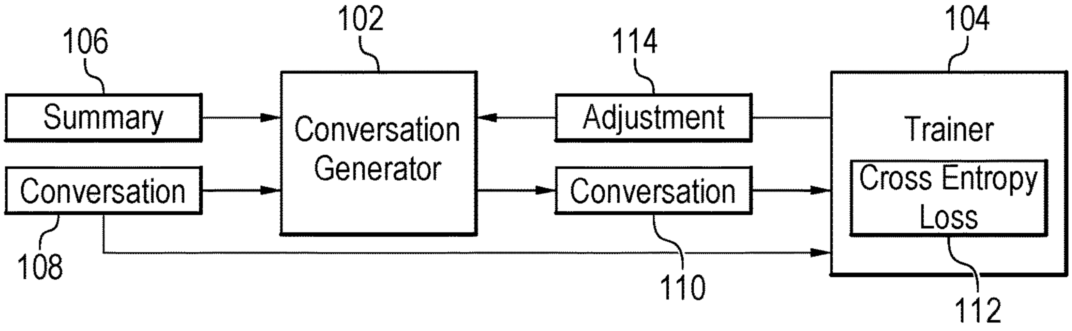
FIG. 1 is a block diagram of an example system for training a summary-grounded conversation generator using cross-entropy loss.

With reference now to FIG. 1, a block diagram shows an example system for training a summary-grounded conversation generator using cross-entropy loss. The example system is generally referred to by the reference number 100. FIG. 1 includes a summary-grounded conversation generator 102. The system 100 includes a trainer 104 communicatively coupled to the summary-grounded conversation generator 102. The system 100 includes a summary 106 and a related conversation 108 shown being received at the summary-grounded conversation generator 102. For example, the summary 106 may be a ground-truth summary used for training. The system 100 includes a conversation 110 shown being generated by the summary-grounded conversation generator 102. For example, the conversation 110 may be generated during training. The trainer 104 includes a cross-entropy loss 112. For example, the cross-entropy loss 112 may be conditioned on ground truth summaries 106. The system 100 includes an adjustment 114 shown being generated by the trainer 104. For example, the adjustment 114 may be used to modify one or more parameters in the summary-grounded conversation generator 102.

In the example of FIG. 1, a first approach to generate conversations grounded on a summary may include training a Sequence to Sequence (seq2seq) model that takes a summary as the input and generates a conversation. For example, the seq2seq model may generate a conversation token by token. As used herein, a token refers to a word from a vocabulary. For example, the token may be unigram. In various examples, the system 100 may use a Supervised Learning (SL) based conversation generation (SL-Gen) in which a pre-trained language model (PLM) is trained to take the summary of a conversation as input and generate an entire conversation. In some examples, the system 100 may use a GPT-2 model and fine-tune on any suitable data source to generate a conversation given a summary as the input. For example, the GPT-2 model may be fined tuned using the SAMSum Corpus, version 1.0.0 released in November 2019. In various examples, the input format may be: <bos> summary text <dialog> conversation text <eos>, where <bos> indicates the beginning of the sequence and <eos> indicates the end of the sequence. In some examples, the system 100 may use different token-type-ids to indicate the summary and the conversation text. The conversation generator 102 is trained to optimize a cross-entropy loss 112.

Figure 4:
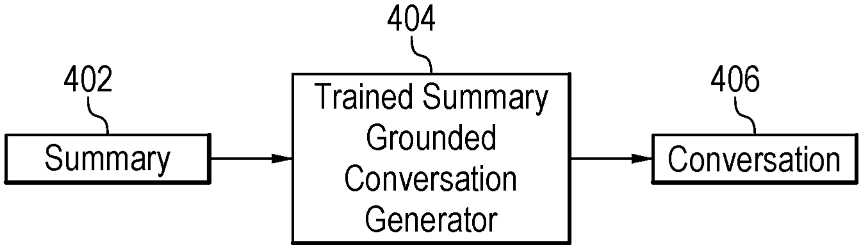
FIG. 4 is a block diagram of an example system for generating conversations using a trained summary-grounded conversation generator.

The resulting trained summary-grounded conversation generator may be used to generate conversations based on input summaries during inference, as described in FIG. 4. For this example, during inference, the system 400 may use top-p nucleus sampling p=0.92. In various examples, the generated conversations may then be used to augment a training process for a summary generator.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional summaries, conversations, or additional losses, etc.).

Figure 2:
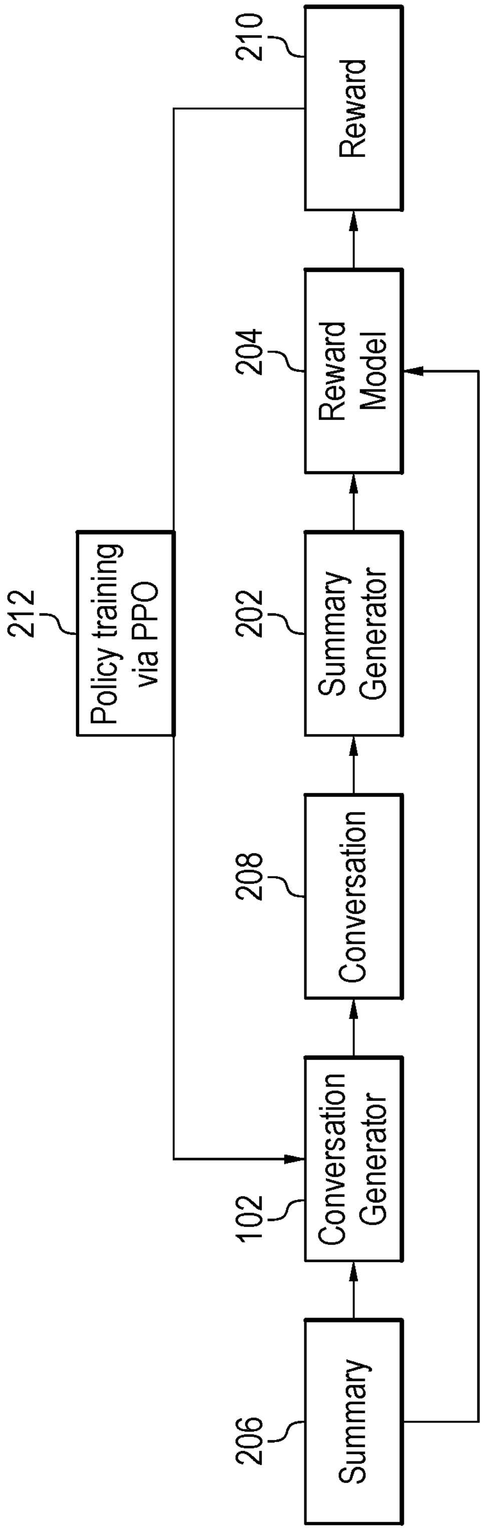
FIG. 2 is a block diagram of an example system for training a summary-grounded conversation generator using a summary generator.

FIG. 2 is a block diagram of an example system for training a summary-grounded conversation generator using a summary generator. The example system is generally referred to by the reference number 200. FIG. 2 includes similarly referenced elements from FIG. 1. For example, the conversation generator 102 may be similarly trained to generate conversations as described in FIG. 1. The system 200 also includes a summary generator 202 communicatively coupled to the conversation generator 102. The system 200 also includes a reward model communicatively coupled to the summary generator 202. The system 200 includes a summary 206 shown being received at the conversation generator 102. The system 200 also includes a conversation 208 shown being generated by the conversation generator 102. The system 200 includes a reward 210 being generated by the reward model 204. The system 200 includes a policy training via proximal policy optimization (PPO) shown being performed using the reward 210.

In the example of FIG. 2, the system 200 can use the quality of the generated conversations 208 as a reward to improve the conversation generator 102. Thus, in addition to the conversation generator 102, the system 200 can train a summary generator 202. The system 200 can train the summary generator 202 to generate a summary given a conversation 208 from the conversation generator 102. In particular, summary generator 202 may use a Reinforced Learning (RL) based conversation generation (RL-Gen).

The training of the conversation generator 102 of system 100 of FIG. 1 using the SL-Gen method may be further improved upon in the system 200 by using the quality of the generated conversations as a reward. In various examples, the quality of the generated conversation 208 may be measured by identifying the similarity between the summary of the generated conversation 108 and the ground truth summary 206. The similarity score is used as a reward to train the conversation generation model.

The conversation generator 102 may be a trained SL-Gen model used as the conversation generator. For example, given a summary, the SL-Gen model can generate a conversation.

The summary generator 202 may be a model combining Bidirectional and Auto-Regressive Transformers (BART) that is pre-trained using a denoising autoencoder for pre-training sequence-to-sequence models. The summary generator 202 is first fine-tuned on a large-scale summarization dataset and then on an annotated conversation summary dataset, such as the SAMSum dataset. In some examples, the system 200 can use a lightweight variant of BART, such as the Distil-BART released in 2019, which is fine-tuned on an extreme summarization task. The system 200 can further fine-tune this instance of BART on the conversation summarization data by providing the conversations as the input and training the BART model to output summaries.

In various examples, once the summary generator 202 generates an output summary for the generated conversation 208, the reward model 204 can compare the output summary with the ground truth summary 206 that was used to ground the conversation generation of the conversation generator 102. In various examples, the reward model 204 can compare the ground truth summary 206 and generated summaries from the summary generator 202, and uses an output score as a reward. For example, the reward model 204 may use a Recall-Oriented Understudy for Gisting Evaluation (ROUGE)-2 $F_1$ score as the reward. ROUGE-2 evaluates the overlap of bigrams between a system and reference summaries, and ROUGE F-1 is the harmonic mean of ROUGE-Recall.

For the policy training 212, the system 200 can use an optimizer to prevent the conversation generator 102 from deviating too far from the pretrained LM. In some examples, proximal policy optimization (PPO) may be used as an optimizer for the policy training. For example, the PPO algorithm may use an objective function that enables multiple epochs of mini-batch updates, and may be implemented using the algorithm:

for iteration=1, 2,...do
  for actor=1, 2, ..., N do
    Run policy $\pi\theta_{old}$ in environment for T time steps
    Compute advantage estimates $\hat{A}_1, \ldots, \hat{A}_T$
  end for
  Optimize surrogate L w.r.t. $\theta$, with K epochs and mini-batch size $M \leq NT$
  $\theta_{old} \leftarrow \theta$
end for where $\theta_{old}$ is the vector of policy parameters before the update policy, $\pi\theta_{old}$ is a stochastic policy based on the vector of policy parameters before the update policy, advantage estimates $\hat{A}_1, \ldots, \hat{A}_T$ are estimates of the advantage function at timesteps 1 . . . T, and surrogate L is a surrogate objective, and θ is the vector of updated policy parameters. In particular, for each iteration, each of N (parallel) actors collect T timesteps of data. Then, the algorithm constructs the surrogate loss on these NT timesteps of data, and optimizes with minibatch SGD or Adam, for K epochs. In various examples, the system 200 can use any other suitable optimizer for the policy training 212.

Using the system 200, the conversation generator 102 may thus be a trained to generate conversations that are longer than the conversations generated by the conversation generator 102 as trained using system 100. The longer conversations may enable more features to be learned when training a summarizer using the longer conversations to augment other conversations.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional summaries, generated conversations, or additional reward models, etc.).

Figure 3:
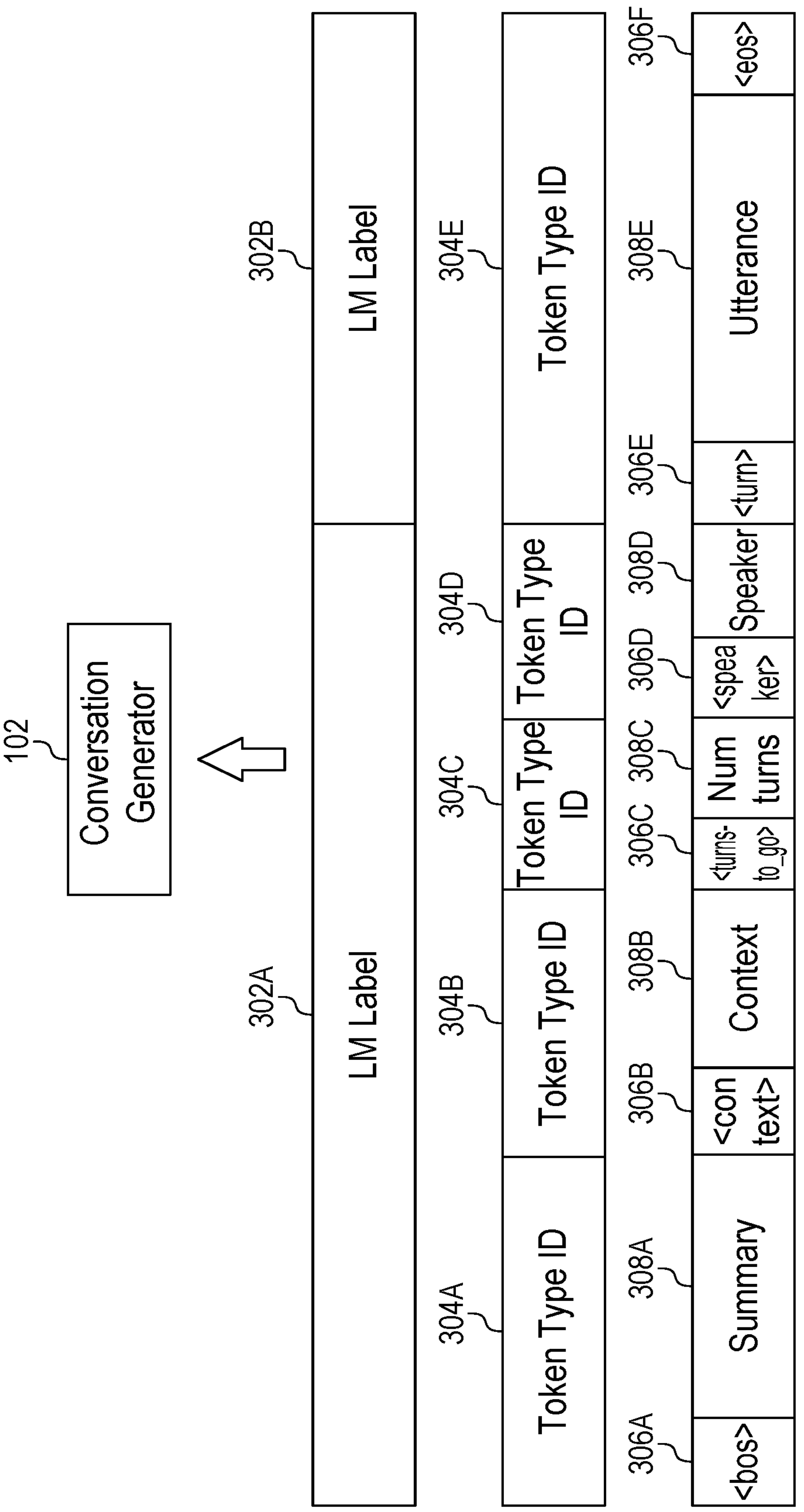
FIG. 3 is a block diagram of an example system for training a summary-grounded conversation generator using pre-defined control parameters.

FIG. 3 is a block diagram of an example system for training a summary-grounded conversation generator using pre-defined control parameters. The example system is generally referred to by the reference number 300. FIG. 3 includes similarly referenced elements from FIG. 1. For example, the conversation generator 102 may be a pre-trained language model such as GPT-2. In addition, the system 300 includes a set of language model (LM) labels including an LM label 302A and an LM label 302B. The LM labels 302A and 302B may be encoded versions of the sequence. For example, the encoded versions may be vectors of numbers encoding the sequence. The LM label 302B is an encoded version of the generated utterance. The system 300 also includes a set of token type IDs, including a summary token type ID 304A, a context token type ID 304B, a num turns token type ID 304C, a speaker token type ID 304D, and an utterance token type ID 304E. The system 300 also further includes a set of input IDs, including a beginning of sequence indicator 306A, a context start indicator 306B, a Num turns start indicator 306C, a speaker start indicator 306D, a turn start indicator 306E, and an end of sequence indicator 306F. The set of input IDs may also include a summary ID 308A, a context ID 308B, a number of turns ID (Num turns) 308C, a speaker ID 308D, and an utterance ID 308E.

In the example of FIG. 3, a method that grants more control over the properties of the generated conversations may be used to train the conversation generator 102. In particular, system 300 may use a controlled turn-by-turn conversation generation (CN-Gen). The use of CN-Gen enables the system 300 to generate conversations turn-by-turn, constrained on the summary and a set of pre-defined control parameters. As used herein, a turn refers to a single utterance by a particular speaker. The system 300 can generate one utterance of the conversation at a time and the properties of the generated utterances are controlled by adding the pre-defined control parameters to the input sequence of the conversation generator 102. Changing the control parameters enables the system 300 to generate different variants of conversations that are grounded on the same summary.

The system 300 may thus use a CN-Gen method for conversation generation that grants more control over the properties of the generated conversations. For example, the system 300 can generate one utterance of the conversation at a time, as opposed to the RL-Gen trained conversation generator of FIG. 2, where system 200 generates the whole conversation at once. The properties of the generated conversations may be controlled by adding several control parameters to the sequence input to the model. In various examples, the pre-defined control parameters may include context, the number of remaining turns (num turns), the speaker of the next turn (speaker), a length of the next turn (turn length), and utterance data, among other pre-defined control parameters. For example, the context may be any previous turns of dialogue prior to the current turn. The Num turns parameter may refer to the number of remaining turns after the current turn. The number of remaining turns may be obtained from the original dialogue. In some examples, additional control parameters may also be used, such as intent of turn, polarity, and number of sentences, among other suitable control parameters. For example, intent of turn may be obtained via a classifier. In some examples, polarity may refer to sentiment and may also be obtained via a classifier.

For example, the Num turns control parameter may indicate a number of remaining turns to generate in the conversation. During the generation of a turn, the Num turns control parameter indicates the remaining number of turns in the conversation. In generating an n turn conversation, the system 300 may start with n as the value for the Num turns control parameter at the first turn and reduce the value by one after the generation of each turn. The value of Num turns may be zero after the generation of the final turn.

In various examples, the Speaker control parameter indicates the speaker of the next turn. This control parameter may be used to indicate to the model the speaker of the next turn. Thus, the model is provided with more context when generating the current turn.

In some examples, a turn length control parameter may indicate a length of the next turn. In some examples, three categories of lengths may be defined. For example, a short length turn may be defined as including less than or equal to 3 tokens. A long length turn may be defined as including greater than 10 tokens. A medium length turn may be defined as including four to 10 tokens.

During training, the system 300 may obtain the values for the control parameters from the ground truth conversations. In various examples, the control parameters described above may be included in the following input representation to fine-tune a GPT-2 model: <bos> summary text <context> dialog context <turns to go> Num turns <speaker> speaker <turn length> turn length <turn> utterance <eos>. Changing these control parameters may enable the system 300 to generate different variants of conversations that are grounded on the same summary.

At inference, the trained conversation generator 102 can randomly select the next speaker, number of turns of the conversation to be generated, and the next turn length. For example, the number of turns may be randomly selected from a range of 4-15 turns. In various examples, conversations of different lengths may be generated by the CN-Gen approach grounded on the same summary by changing the control parameters. For example, a specific number of turns may also be provided as additional input.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional models, labels, tokens, input IDs, or additional token type IDs, etc.).

FIG. 4 is a block diagram of an example system for generating conversations using a trained summary-grounded conversation generator. The example system is generally referred to by the reference number 400. FIG. 4 includes a summary 402 shown being received at a trained summary-grounded conversation generator 404. For example, the trained summary-grounded conversation generator 404 may have been trained using any of the systems 100-300 of FIGS. 1-3. The system 400 includes a conversation 406 shown generated by the summary-grounded conversation generator 404.

In the example of FIG. 4, the summary-grounded conversation generator 404 receives a summary 402 and outputs a conversation 406. In various examples, depending on how the summary-grounded conversation generator 404 was trained, the operation of the summary-grounded conversation generator 404 may differ at the inference stage.

For example, if the summary-grounded conversation generator 404 was trained using system 100 or 200 above, then the summary-grounded conversation generator 404 may receive a summary and output a conversation 406. If the summary-grounded conversation generator 404 was trained using system 100, then during the inference stage, the system 400 may use top-p nucleus sampling. For example, the system 400 may use p=0.92.

In various examples, if the summary-grounded conversation generator 404 was trained using system 300 of FIG. 3, then the trained summary-grounded conversation generator 404 can also randomly select a next speaker, a number of turns of the conversation to be generated, and a next turn length for control parameters. For example, the summary-grounded conversation generator 404 can randomly select the number of turns from a range of 4-15 turns, or any other suitable range. In various examples, conversations of different lengths may be generated by the summary-grounded conversation generator 404 grounded on the same summary by changing the control parameters. In some examples, one or more values for the control parameters may be received at the summary-grounded conversation generator 404 to enable control of the generated conversations.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional summaries, or additional conversations, etc.). For example, the system 400 may also further include a conversation summarizer trainer that can train a conversation summarizer using training data augmented with the generated conversations from the trained summary-grounded conversation generator 404. In some examples, the training data may be augmented such that 30% of the training data is generated conversations.

Figure 5:
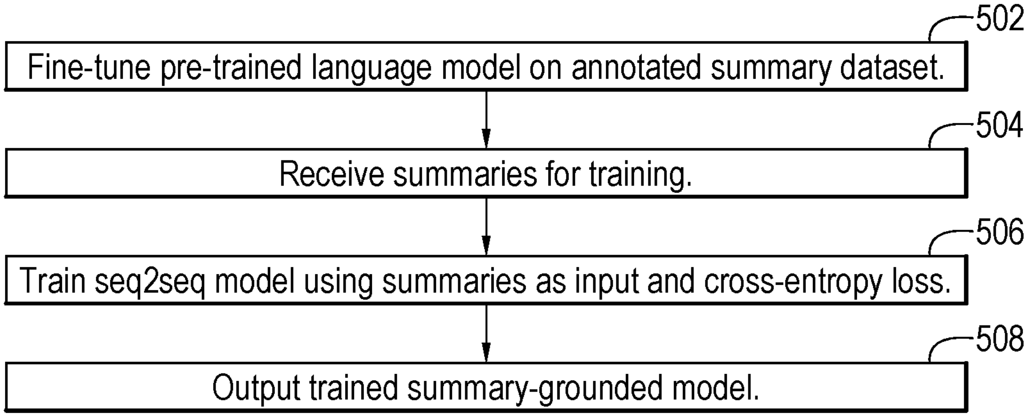
FIG. 5 is a block diagram of an example method that can train a summary-grounded conversation generator using cross-entropy loss.

FIG. 5 is a process flow diagram of an example method that can train a summary-grounded conversation generator using cross-entropy loss. The method 500 can be implemented with any suitable computing device, such as the computing device 900 of FIG. 9 and is described with reference to the systems 100 FIG. 1. For example, the method described below can be implemented by the summary grounded trainer module 926 or the summary-grounded trainer module 1208 of FIGS. 9 and 12.

At block 502, a processor fine-tunes a pre-trained language model on an annotated summary dataset. For example, the pre-trained language model may be the GPT-2 model. In various examples, the annotated summary dataset may be the SAMSum Corpus.

At block 504, the processor receives summaries for training. For example, the summaries and their associated conversation text may be extracted from the annotated summary dataset.

At block 506, the processor trains a sequence to sequence (seq2seq) model using summaries as input and a cross-entropy loss. For example, the input format may be: <bos> summary text <dialog> conversation text <eos>. In various examples, different token-type-IDs may indicate the summary and the conversation text. The processor may train the seq2seq model to optimize a cross-entropy loss function.

At block 508, the processor outputs a trained summary-grounded model. For example, the trained summary-grounded model may be used to generate multiple different conversations given an input summary.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
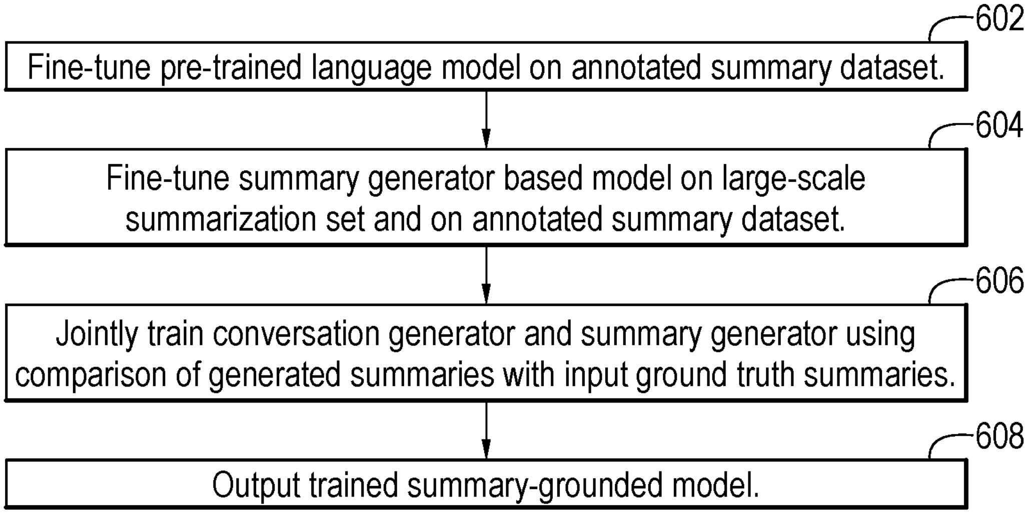
FIG. 6 is a block diagram of an example method that can train a summary-grounded conversation generator using a summary generator.

FIG. 6 is a process flow diagram of an example method that can train a summary-grounded conversation generator using a summary generator. The method 600 can be implemented with any suitable computing device, such as the computing device 900 of FIG. 9 and is described with reference to the system 200 of FIG. 2. For example, the method described below can be implemented by the summary grounded trainer module 926 or the summary-grounded trainer module 1208 of FIGS. 9 and 12.

At block 602, a processor fine-tunes a pre-trained language model on an annotated summary dataset. For example, the pre-trained language model may be the GPT-2 model. In various examples, the annotated summary dataset may be the SAMSum Corpus, or any other suitable annotated summary dataset. For example, a percentage of the samples in the SAMSum Corpus may be used for fine-tuning the pre-trained language model.

At block 604, the processor fine-tunes a summary generator on large-scale summarization set and on the annotated summary dataset. For example, the summary generator may be based on a model combining Bidirectional and Auto-Regressive Transformers (BART). In various examples, the large-scale summarization set may be a data set with more than 10,000 samples. In various examples, the annotated summary dataset may be the SAMSum Corpus, or any other suitable annotated summary dataset. In some examples, the BART model may be a lightweight variant of BART such as Distil-BART that is a smaller version of the BART model that is fine-tuned on the Extreme summarization task. The light weight variant may then be fine-tuned on the conversation summarization data by providing the conversations as input and training the model to output summaries.

At block 606, the processor jointly trains a conversation generator and a summary generator using comparison of generated summaries with input ground truth summaries. In various examples, the processor may train the conversation generator using a reward model that compares GT and generated summaries from the summary generator. For example, the reward may be a ROUGE-2 F1-score. In some examples, the processor may use proximal policy optimization as an optimizer for training the conversation generator.

At block 608, the processor outputs a trained summary-grounded model. For example, the trained summary-grounded model may be used to generate multiple different conversations given an input summary.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
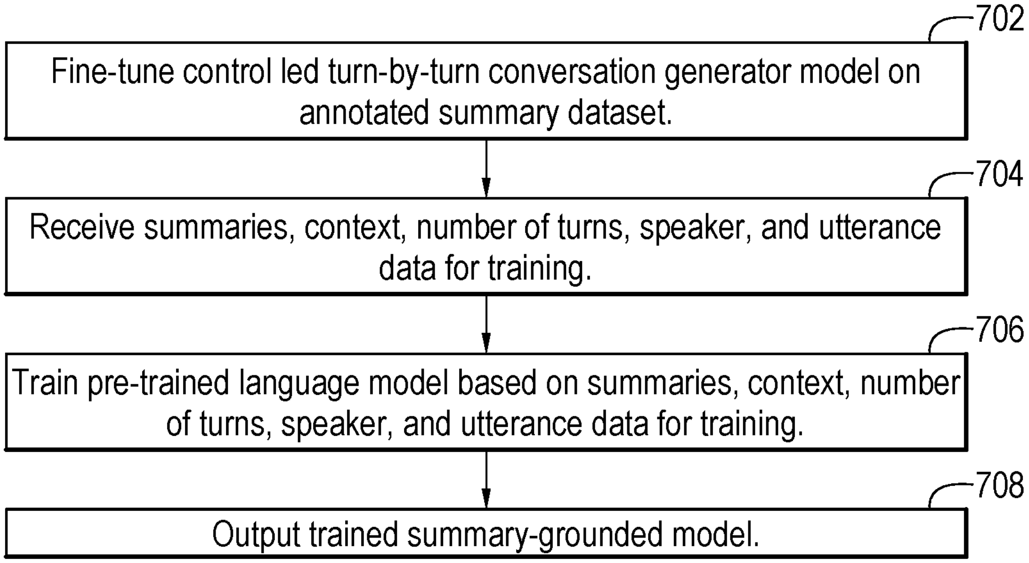
FIG. 7 is a block diagram of an example method that can train a summary-grounded conversation generator using additional inputs.

FIG. 7 is a process flow diagram of an example method that can train a summary-grounded conversation generator using additional inputs. The method 700 can be implemented with any suitable computing device, such as the computing device 900 of FIG. 9 and is described with reference to the systems 300 of FIG. 3. For example, the method described below can be implemented by the summary grounded trainer module 926 or the summary-grounded trainer module 1208 of FIGS. 9 and 12.

At block 702, a processor fine-tunes pre-trained language model on an annotated summary dataset. For example, the pre-trained language model may be the GPT-2 model. In various examples, the annotated summary dataset may be the SAMSum Corpus.

At block 704, the processor receives summaries, a context, a number of turns, speaker, and utterance data for training. For example, a set of received control parameters may include the number of turns to generate in the conversation, a speaker of a next turn, and a length of the next turn. For example, the context may be the previous turns at the generation of a given turn. The number of turns may be the remaining number of turns to generate in the conversation at the generation of a given turn. The speaker may be the speaker of the next turn. In some examples, the length of the next turn includes a predefined category of length. In various examples, the values of the control parameters may be obtained from ground truth conversations.

At block 706, the processor trains a pre-trained language model based on summaries, context, number of turns, speaker, and utterance data for training. For example, the processor may train the pre-trained language model using one utterance of a conversation at a time.

At block 708, the processor outputs a trained summary-grounded model. For example, the trained summary-grounded model may be used to generate multiple different conversations given an input summary.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
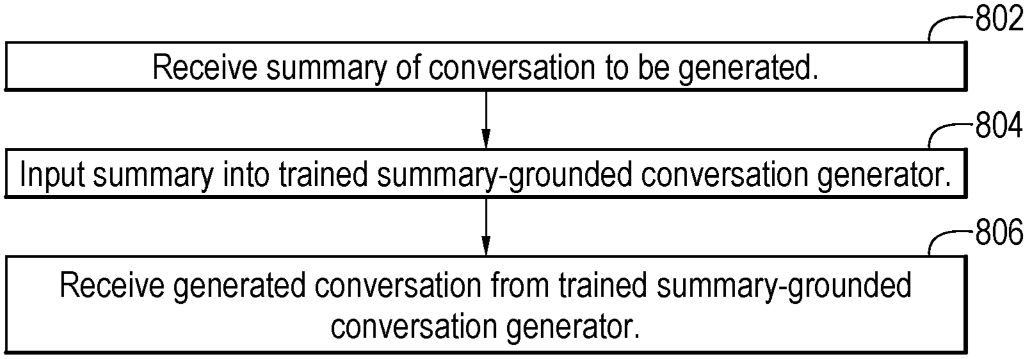
FIG. 8 is a block diagram of an example method that can generate conversations using a trained summary-grounded conversation generator.

FIG. 8 is a process flow diagram of an example method that can generate conversations using a trained summary-grounded conversation generator. The method 800 can be implemented with any suitable computing device, such as the computing device 900 of FIG. 9 and is described with reference to the systems 400 of FIG. 4. For example, the method described below can be implemented by the conversation generator module 928 or the conversation generator module 1210 of FIGS. 9 and 12.

At block 802, a processor receives a summary of conversation to be generated. For example, the summary may be part of a training dataset to be augmented. In some examples, such as if the trained summary-grounded conversation generator was trained using method 600, then the processor may also receive a value for top-p nucleus sampling. For example, p=0.92. In some examples, the processor can also sample or receive an explicitly specified next speaker for each turn.

At block 804, the processor inputs the summary into a trained summary-grounded conversation generator. For example, the trained summary-grounded conversation generator may have been trained using any of methods 500-700 described above.

At block 806, the processor receives generated conversation from trained summary-grounded conversation generator. In some examples, such as in the CN-Gen conversation generator trained in FIGS. 3 and 7, the processor may receive one generated turn of conversation at a time. Alternatively, such as in the SL-Gen and RL-Gen conversation generators trained in FIGS. 1, 2, 5, and 6, the processor may receive an entire conversation from the trained summary-grounded conversation generator. In various examples, the generated conversation may be used to augment a training dataset including the summary. For example, the augmented training dataset may be used to train a summarizer.

The process flow diagram of FIG. 8 is not intended to indicate that the operations of the method 800 are to be executed in any particular order, or that all of the operations of the method 800 are to be included in every case. Additionally, the method 800 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
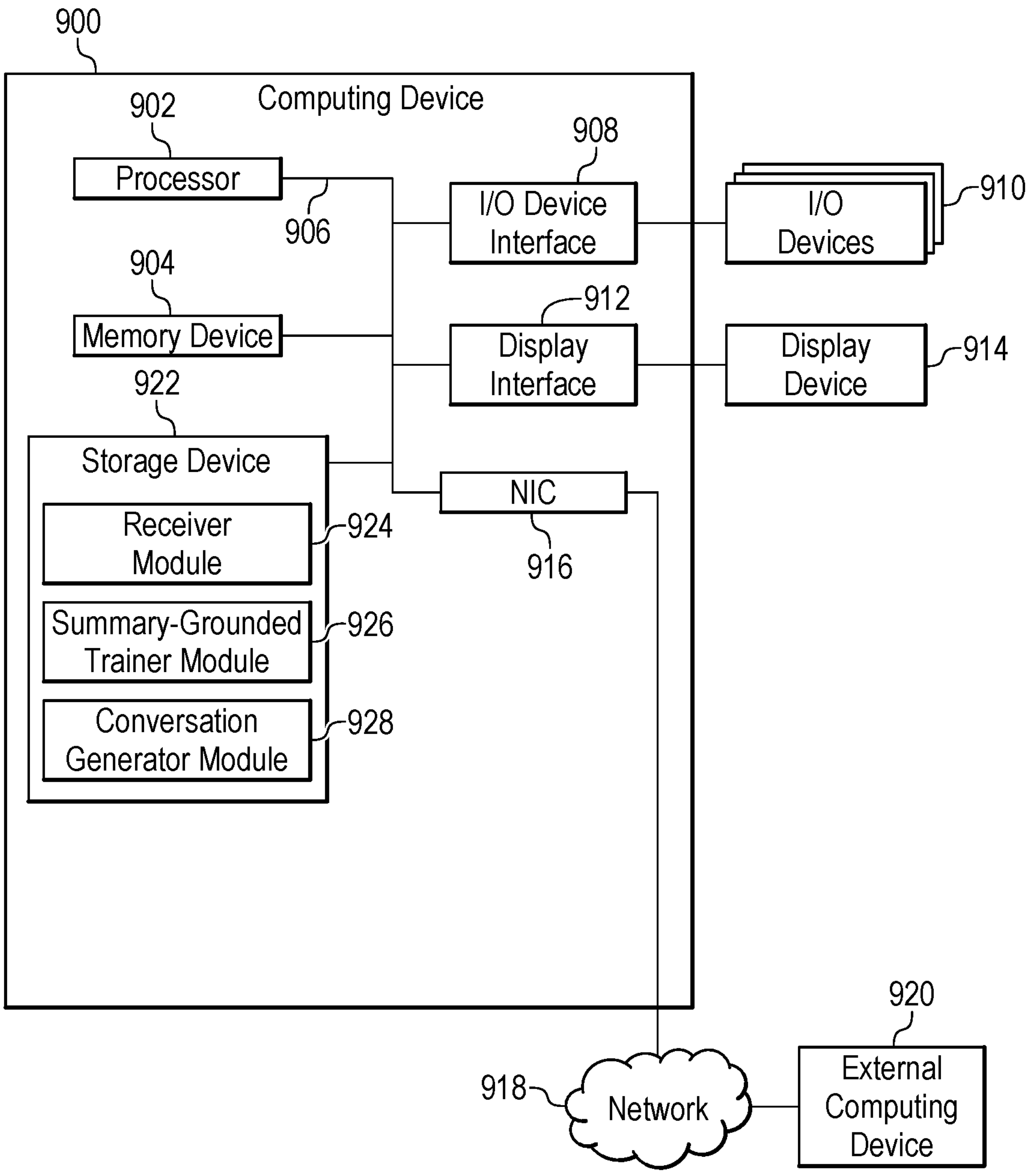
FIG. 9 is a block diagram of an example computing device that can generate conversations using a trained summary-grounded conversation generator.

FIG. 9 is block diagram of an example computing device that can generate conversations using a trained summary-grounded conversation generator. The computing device 900 may be for example, a server, desktop computer, laptop computer, tablet computer, or smartphone. In some examples, computing device 900 may be a cloud computing node. Computing device 900 may be described in the general context of computer system executable instructions, such as program modules, being executed by a computer system. Generally, program modules may include routines, programs, objects, components, logic, data structures, and so on that perform particular tasks or implement particular abstract data types. Computing device 900 may be practiced in distributed cloud computing environments where tasks are performed by remote processing devices that are linked through a communications network. In a distributed cloud computing environment, program modules may be located in both local and remote computer system storage media including memory storage devices.

The computing device 900 may include a processor 902 that is to execute stored instructions, a memory device 904 to provide temporary memory space for operations of said instructions during operation. The processor can be a single-core processor, multi-core processor, computing cluster, or any number of other configurations. The memory 904 can include random access memory (RAM), read only memory, flash memory, or any other suitable memory systems.

The processor 902 may be connected through a system interconnect 906 (e.g., PCI®, PCI-Express®, etc.) to an input/output (I/O) device interface 908 adapted to connect the computing device 900 to one or more I/O devices 910. The I/O devices 910 may include, for example, a keyboard and a pointing device, wherein the pointing device may include a touchpad or a touchscreen, among others. The I/O devices 910 may be built-in components of the computing device 900, or may be devices that are externally connected to the computing device 900.

The processor 902 may also be linked through the system interconnect 906 to a display interface 912 adapted to connect the computing device 900 to a display device 914. The display device 914 may include a display screen that is a built-in component of the computing device 900. The display device 914 may also include a computer monitor, television, or projector, among others, that is externally connected to the computing device 900. In addition, a network interface controller (NIC) 916 may be adapted to connect the computing device 900 through the system interconnect 906 to the network 918. In some embodiments, the NIC 916 can transmit data using any suitable interface or protocol, such as the internet small computer system interface, among others. The network 918 may be a cellular network, a radio network, a wide area network (WAN), a local area network (LAN), or the Internet, among others. An external computing device 920 may connect to the computing device 900 through the network 918. In some examples, external computing device 920 may be an external webserver 920. In some examples, external computing device 920 may be a cloud computing node.

The processor 902 may also be linked through the system interconnect 906 to a storage device 922 that can include a hard drive, an optical drive, a USB flash drive, an array of drives, or any combinations thereof. In some examples, the storage device may include a receiver module 924, a summary-grounded trainer module 926, and a conversation generator module 928. The receiver module 924 can receive a summary of a conversation to be generated. The module 924 can also receive summaries and texts of conversations for training. In some examples, the receiver module 924 can receive additional data for training, such as context, number of turns, speaker, and utterance data. In The summary-grounded trainer module 926 can train a summary-grounded model. For example, the summary-grounded trainer module 926 can train a summary-grounded model using any of methods 500-700 of FIGS. 5-7. In some examples, the summary-grounded trainer module 926 can calculate a reward based on a Recall-Oriented Understudy for Gisting Evaluation (ROUGE)-2 F1 score. In various examples, the summary-grounded trainer module 926 can train a reinforced learning based conversation generator using proximal policy optimization. The conversation generator module 928 can input the summary into a trained summary-grounded conversation generator. For example, the trained summary-grounded conversation generator includes a supervised learning based conversation generator including a pre-trained language model fine-tuned using an entropy loss. In some examples, the trained summary-grounded conversation generator includes a reinforced learning based conversation generator including a supervised learning based conversation generator further trained with a summary generator using a quality of generated conversations as a reward. In various examples, the trained summary-grounded conversation generator includes a controlled turn-by-turn conversation generator including a pre-trained language model fine-tuned using a number of control parameters. The conversation generator module 928 can receive a generated conversation from the trained summary-grounded conversation generator.

It is to be understood that the block diagram of FIG. 9 is not intended to indicate that the computing device 900 is to include all of the components shown in FIG. 9. Rather, the computing device 900 can include fewer or additional components not illustrated in FIG. 9 (e.g., additional memory components, embedded controllers, modules, additional network interfaces, etc.). For example, a summarizer trainer can be included to train a summarizer based on the generated conversation. Furthermore, any of the functionalities of the receiver module 924, the summary-grounded trainer module 926, and the conversation generator module 928 may be partially, or entirely, implemented in hardware and/or in the processor 902. For example, the functionality may be implemented with an application specific integrated circuit, logic implemented in an embedded controller, or in logic implemented in the processor 902, among others. In some embodiments, the functionalities of the receiver module 924, the summary-grounded trainer module 926, and the conversation generator module 928 can be implemented with logic, wherein the logic, as referred to herein, can include any suitable hardware (e.g., a processor, among others), software (e.g., an application, among others), firmware, or any suitable combination of hardware, software, and firmware.

Figure 10:
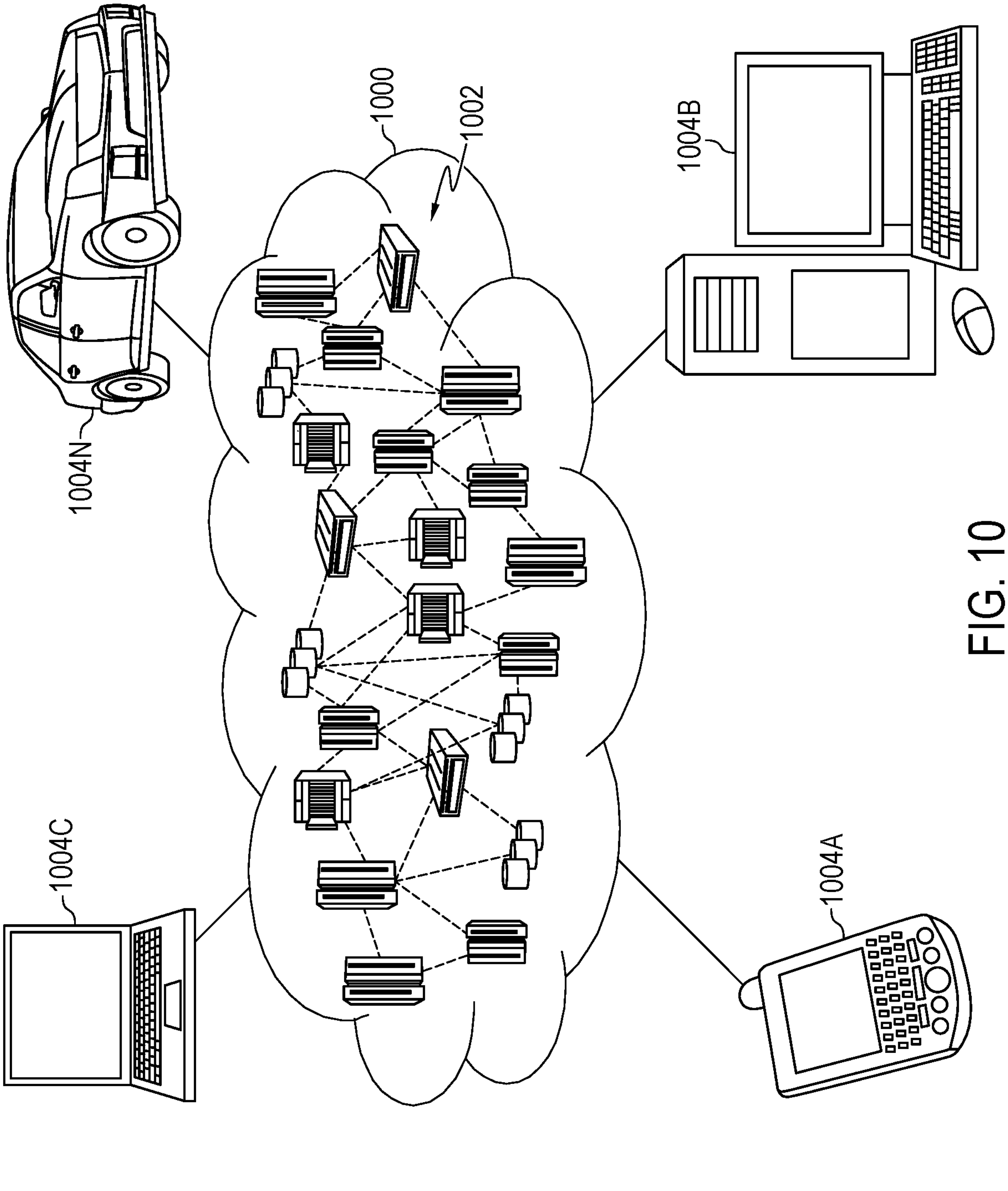
FIG. 10 is a diagram of an example cloud computing environment according to embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004A, desktop computer 1004B, laptop computer 1004C, and/or automobile computer system 1004N may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004A-N shown in FIG. 10 are intended to be illustrative only and that computing nodes 1002 and cloud computing environment 1000 can communicate with any type of computerized device over any type of network and/or network addressable connection (e.g., using a web browser).

Figure 11:
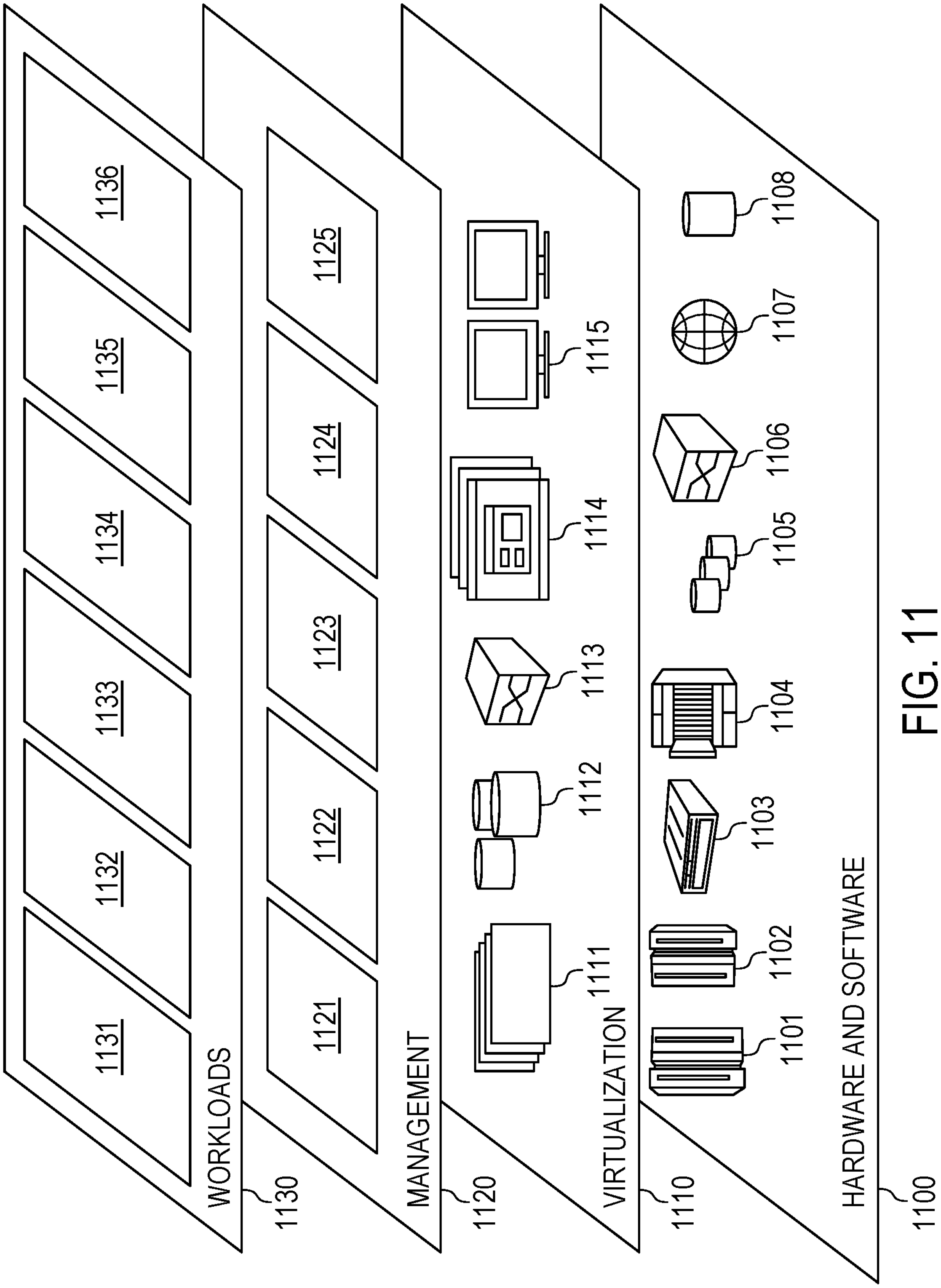
FIG. 11 is a diagram of an example abstraction model layers according to embodiments described herein.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1100 includes hardware and software components. Examples of hardware components include: mainframes 1101; RISC (Reduced Instruction Set Computer) architecture based servers 1102; servers 1103; blade servers 1104; storage devices 1105; and networks and networking components 1106. In some embodiments, software components include network application server software 1107 and database software 1108.

Virtualization layer 1110 provides an abstraction layer from which the following examples of virtual entities may be provided: virtual servers 1111; virtual storage 1112; virtual networks 1113, including virtual private networks; virtual applications and operating systems 1114; and virtual clients 1115.

In one example, management layer 1120 may provide the functions described below. Resource provisioning 1121 provides dynamic procurement of computing resources and other resources that are utilized to perform tasks within the cloud computing environment. Metering and Pricing 1122 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1123 provides access to the cloud computing environment for consumers and system administrators. Service level management 1124 provides cloud computing resource allocation and management such that required service levels are met. Service Level Agreement (SLA) planning and fulfillment 1125 provide pre-arrangement for, and procurement of, cloud computing resources for which a future requirement is anticipated in accordance with an SLA.

Workloads layer 1130 provides examples of functionality for which the cloud computing environment may be utilized. Examples of workloads and functions which may be provided from this layer include: mapping and navigation 1131; software development and lifecycle management 1132; virtual classroom education delivery 1133; data analytics processing 1134; transaction processing 1135; and summary-grounded conversation generation 1136.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 12:
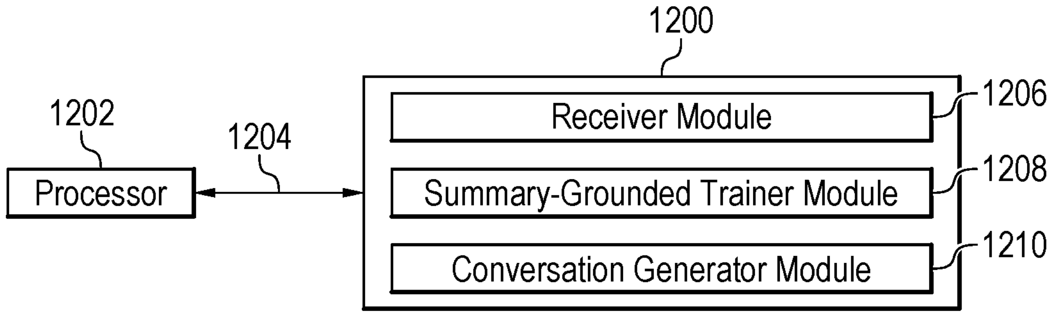
FIG. 12 is an example tangible, non-transitory computer-readable medium that can generate conversations using a trained summary-grounded conversation generator.

Referring now to FIG. 12, a block diagram is depicted of an example tangible, non-transitory computer-readable medium 1200 that can generate conversations using a trained summary-grounded conversation generator. The tangible, non-transitory, computer-readable medium 1200 may be accessed by a processor 1202 over a computer interconnect 1204. Furthermore, the tangible, non-transitory, computer-readable medium 1200 may include code to direct the processor 1202 to perform the operations of the methods 500-800 of FIGS. 5-8.

The various software components discussed herein may be stored on the tangible, non-transitory, computer-readable medium 1200, as indicated in FIG. 12. For example, a receiver 1206 includes code to receive summaries and texts of conversations for training. In some examples, the receiver module 1206 also includes code to receive additional data for training, such as context, number of turns, speaker, and utterance data. The receiver module 1206 also includes code to receive a summary of a conversation to be generated. In some examples, the receiver module 1206 includes code to receive any number of control parameters. For example, the control parameters may include a number of turns to generate in the conversation. A summary-grounded trainer module 1208 includes code to train a summary-grounded model. For example, the summary-grounded trainer module 1208 includes code to fine-tune a pre-trained language model on an annotated summary dataset, receive summaries for training, and train a sequence to sequence model using the summaries as input and a cross-entropy loss function. In some examples, the summary-grounded trainer module 1208 includes code to fine-tune a pre-trained language model on an annotated summary dataset, fine-tune a summary generator on a large-scale summarization set and on the annotated summary dataset, and jointly train the summary-grounded conversation generator and the summary generator using a comparison of generated summaries with input ground truth summaries. For example, the summary generator may be a Bayesian Additive Regression Tree (BART) based model. In various examples, the summary-grounded trainer module 1208 includes code to receive summaries, a number of control parameters, and utterance data for training and train a pre-trained language model based on the summaries, a number of control parameters, and utterance data. A conversation generator module 1210 includes code to input the summary into a trained summary-grounded conversation generator. The conversation generator module 1210 also includes code to receive a generated conversation from the trained summary-grounded conversation generator. In some examples, the generated conversation includes a number of turns based on received control parameters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 12 may be included within the tangible, non-transitory, computer-readable medium 1200, depending on the specific application. For example, in some embodiments, the computer-readable medium 1200 may include a summarizer trainer to train a summarizer based on the generated conversation.

FIG. 13A is an example set of conversations generated by various embodiments described herein. In particular, SL-Gen may have been trained to generate the conversations via the system 100, RL-Gen may have been trained to generate the conversations using the system 200. As seen in FIG. 13A, conversations generated by the RL-Gen trained conversation generator may tend to be longer than the conversations generated by the SL-Gen trained conversation generator.

FIG. 13B is a continuation of the example set of conversations generated by various embodiments described herein. In particular, in FIG. 13B, examples for CN-Gen are shown for both 5 turns and 9 turns. In various examples, the CN-Gen may have been trained to generate the example conversations using the system 300.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:

fine-tuning a pre-trained language model on an annotated summary dataset;

training the pre-trained language model based on a plurality of pre-defined control parameters including a plurality of summaries, a context, a number of turns, a speaker, and utterance data;

outputting a trained summary-grounded conversation generator;

receive a summary of a conversation, wherein the summary comprises a brief description of main points to be included in the conversation to be generated;

input the summary into the trained summary-grounded conversation generator, wherein the trained summary-grounded conversation generator includes controlled turn-by-turn conversation generator utilizing a plurality of control parameters, wherein the plurality of control parameters includes a speaker of a next turn, a length of the next turn, and a remaining number of turns, and wherein the length of the next turn comprises a predefined category length; and generating two or more conversations based on the summary, wherein each of the two or more conversations are generated one utterance at a time and include a plurality of turns, and wherein the two or more whole conversations are different variations of conversations grounded in the same summary with different control parameters.

2. The system of claim 1, wherein the trained summary-grounded conversation generator comprises a supervised learning based conversation generator comprising a pre-trained language model fine-tuned using an entropy loss.

3. The system of claim 1, wherein the trained summary-grounded conversation generator comprises a reinforced learning based conversation generator comprising a supervised learning based conversation generator further trained with a summary generator using a quality of the generated conversations as a reward, wherein the reward is determined based on a comparison of generated summaries with input ground truth summaries.

4. The system of claim 1, wherein the processor is to calculate the reward based on a Recall-Oriented Understudy for Gisting Evaluation (ROUGE)-2 F1 score.

5. The system of claim 1, wherein the processor is to train the reinforced learning based conversation generator using proximal policy optimization, and wherein the processor is to train a summarizer based on the two or more generated conversation.

6. The system of claim 1, wherein the context is a previous turns at a generation of a given turn, the number of turns is a remaining number of turns to generate in the conversation at the generation of a given turn, the speaker is the speaker of the next turn, wherein the length of the next turn includes a predefined category length, and values of the control parameters are obtained from ground truth conversations.

7. A computer-implemented method, comprising:

fine-tuning a pre-trained language model on an annotated summary dataset;

training the pre-trained language model based on a plurality of pre-defined control parameters including a plurality of summaries, a context, a number of turns, a speaker, and utterance data;

outputting a trained summary-grounded conversation generator;

receive a summary of a conversation to be generated, wherein the summary comprises a brief description of main points to be included in the conversation to be generated;

input the summary into the trained summary-grounded conversation generator, wherein the trained summary-grounded conversation generator includes controlled turn-by-turn conversation generator utilizing a plurality of control parameters, wherein the plurality of control parameters includes a speaker of a next turn, a length of the next turn, and a remaining number of turns, and wherein the length of the next turn comprises a predefined category length; and generating two or more conversations based on the summary, wherein each of the two or more conversations are generated one utterance at a time and include a plurality of turns, and wherein the two or more whole conversations are different variations of conversations grounded in the same summary with different control parameters.

8. The computer-implemented method of claim 7, further comprising training the trained summary-grounded conversation generator, wherein training the trained summary-grounded conversation generator comprises:

fine-tuning, via the processor, a pre-trained language model on an annotated summary dataset;

receiving, via the processor, summaries for training; and training, via the processor, a sequence to sequence model using the summaries as input and a cross-entropy loss function.

9. The computer-implemented method of claim 7, further comprising training the trained summary-grounded conversation generator, wherein training the trained summary-grounded conversation generator comprises:

fine-tuning, via the processor, a pre-trained language model on an annotated summary dataset;

fine-tuning, via the processor, a summary generator on a large-scale summarization set and on the annotated summary dataset; and jointly training, via the processor, the summary-grounded conversation generator and the summary generator using a comparison of generated summaries with input ground truth summaries.

10. The computer-implemented method of claim 7, further comprising training the trained summary-grounded conversation generator, wherein training the trained summary-grounded conversation generator comprises:

receiving, via the processor, summaries, a plurality of control parameters, and utterance data for training; and train a pre-trained language model based on the summaries, a plurality of control parameters, and utterance data.

11. The computer-implemented method of claim 10, wherein the plurality of control parameters comprise a number of turns to generate in the conversation, a speaker of a next turn, and a length of the next turn.

12. The computer-implemented method of claim 11, wherein the length of the next turn comprises a predefined category of length.

13. The computer-implemented method of claim 7, further comprising training, via the processor, a summarizer based on the wholly generated conversation.

14. A computer program product for generating summary-grounded conversations, the computer program product comprising a computer-readable storage medium having program code embodied therewith, the program code executable by a processor to cause the processor to:

fine-tuning a pre-trained language model on an annotated summary dataset;

training the pre-trained language model based on a plurality of pre-defined control parameters including a plurality of summaries, a context, a number of turns, a speaker, and utterance data;

outputting a trained summary-grounded conversation generator;

receive a summary of a conversation to be generated, wherein the summary comprises a brief description of main points to be included in the conversation to be generated;

input the summary into the trained summary-grounded conversation generator, wherein the trained summary-grounded conversation generator includes controlled turn-by-turn conversation generator utilizing a plurality of control parameters, wherein the plurality of control parameters includes a speaker of a next turn, a length of the next turn, and a remaining number of turns, and wherein the length of the next turn comprises a predefined category length; and generating two or more conversations based on the summary, wherein each of the two or more conversations are generated one utterance at a time and include a plurality of turns, and wherein the two or more whole conversations are different variations of conversations grounded in the same summary with different control parameters.

15. The computer program product of claim 14, further comprising program code executable by the processor to:

fine-tune a pre-trained language model on an annotated summary dataset;

receive summaries for training; and train a sequence to sequence model using the summaries as input and a cross-entropy loss function.

16. The computer program product of claim 14, further comprising program code executable by the processor to:

fine-tune a pre-trained language model on an annotated summary dataset;

fine-tune a summary generator on a large-scale summarization set and on the annotated summary dataset; and jointly train the summary-grounded conversation generator and the summary generator using a comparison of generated summaries with input ground truth summaries.

17. The computer program product of claim 14, further comprising program code executable by the processor to receive summaries, a plurality of control parameters, and utterance data for training and train a pre-trained language model based on the summaries, a plurality of control parameters, and utterance data.

18. The computer program product of claim 14, further comprising program code executable by the processor to receive a control parameter comprising a number of turns to generate in the conversation, wherein the generated conversation comprises a number of turns based on the control parameter.

19. The computer program product of claim 14, further comprising program code executable by the processor to train a summarizer based on the wholly generated conversation.

20. The computer program product of claim 14, wherein the program code is executable by the processor to cause the processor to receive a plurality of different wholly generated conversations generated based on the summary from the trained summary-grounded conversation generator.

* * * * *